US006829236B1

(12) United States Patent
Archer

(10) Patent No.: US 6,829,236 B1
(45) Date of Patent: *Dec. 7, 2004

(54) SYSTEM AND METHOD FOR PROVIDING AUTOMATED DIRECTORY ASSISTANCE VIA THE INTERNET AND CORRESPONDING CALL COMPLETION WITHIN A TELECOMMUNICATIONS SYSTEM

(75) Inventor: Michael Archer, Richardson, TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 981 days.

(21) Appl. No.: 08/988,080

(22) Filed: Dec. 10, 1997

(51) Int. Cl.[7] .......................... H04L 12/66; H04L 12/28; H04M 1/64; H04M 3/42
(52) U.S. Cl. .................... 370/353; 370/389; 370/395.2; 379/201; 379/88
(58) Field of Search ................................ 379/201, 213, 379/93.01, 93.05, 230, 221, 219, 200, 207, 223, 217, 218; 370/352–356, 353, 380, 389

(56) References Cited

U.S. PATENT DOCUMENTS

| | | | |
|---|---|---|---|
| 5,809,128 A | * 9/1998 | McMullin | 379/215 |
| 5,813,006 A | * 9/1998 | Polnerow et al. | 707/10 |
| 5,850,433 A | * 12/1998 | Rondeau | 379/201 |
| 5,889,774 A | * 3/1999 | Mirashrafi et al. | 370/352 |
| 5,943,410 A | * 8/1999 | Shaffer et al. | 379/213 |
| 5,987,508 A | * 11/1999 | Agraharam et al. | 379/93.24 |
| 6,144,667 A | * 11/2000 | Doshi et al. | 379/401 |

FOREIGN PATENT DOCUMENTS

| | | | |
|---|---|---|---|
| FR | WO 97/22210 | * 6/1997 | ............ H04Q/3/00 |
| US | WO 97/19548 | * 5/1997 | .......... H04M/15/00 |

OTHER PUBLICATIONS

"Digital ID Services for Individuals" retrieved via the Internet and World–Wide–Web at the VeriSign Web page, Jun. 20, 1997 at 9:36:22 am.
"Feature Story" retrieved via the Internet and World–Wide–Web at the VeriSign Web Page, Jun. 20, 1997 at 9:46:38 am.
"Get Your Digital ID Now!" retrieved via the Internet and World–Wide–Web at the VeriSIgn Web Page, Jun. 20, 1997 at 9:35:42 am.
"Digital ID Fact Sheet" retrieved via the Internet and World–Wide–Web at the VeriSign Web Page, Jun. 20, 1998 at 9:37:00 am.

(List continued on next page.)

Primary Examiner—Hassan Kizou
Assistant Examiner—Hanh Nguyen

(57) ABSTRACT

A system and method for servicing a request for directory assistance information and for initiating a corresponding call within a telecommunications system. The system and method include and involve a data storage sub-system for storing directory assistance information including a telephone number associated with a particular called party. Also included and involved is a processor that is coupled to the data storage sub-system and which is operative to receive the request for directory assistance information from a calling party via the Internet. The request includes an indicator of the called party. The processor is also operative to determine the telephone number based on the indicator related to the called party, and to receive a request from the calling party to initiate a call from the calling party to the called party within the telecommunications system based on the telephone number.

23 Claims, 4 Drawing Sheets

OTHER PUBLICATIONS

"Find a Person" retrieved via the Internet and World–Wide–Web at the VeriSign Web Page, Jun. 18, 1998 at 2:20:02 pm.

"Switchboard Home Page" retrieved via the Internet and World–Wide–Web at the Switchboard Home page, Jun. 18, 1998 at 2:14:28 pm.

"People Query Results" retrieved via the Internet and World–Wide–Web at the Switchboard Home Page, Jun. 18, 1998 at 2:20:51 pm.

"Send Greeting Cards and Letters–Switchboard . . . " retrieved via the Internet and World–Wide–Web at the Switchboard Home Page, Jun. 18, 1998 at 2:21:33 pm.

* cited by examiner

SYSTEM AND METHOD FOR PROVIDING AUTOMATED DIRECTORY ASSISTANCE VIA THE INTERNET AND CORRESPONDING CALL COMPLETION WITHIN A TELECOMMUNICATIONS SYSTEM

BACKGROUND OF THE INVENTION

1. Field of the Invention

The present invention relates to telephone directory assistance services which are accessed via the Internet.

2. Description of the Related Art

Since the creation of the telephone, users have been able to peruse telephone books and printed directories to locate telephone numbers and information related to other users. For many people, the telephone book remains a valuable source of contact information and the like. Unfortunately, however, as the number of telephone system users has increased in recent years, producers of telephone books and directories have found themselves facing a serious problem related to maintaining accurate and current telephone listings. This problem is exacerbated by the fact that the telecommunications industry, in general, continues to experience many infrastructure changes that often cause whole blocks of telephone numbers including area codes and exchange identifiers to change.

Despite the increased number of users and the changes that continue to occur within the telecommunications industry, telephone system users still have a need for accurate and current telephone system listing information. Accordingly, to address such needs and to attempt to solve the aforementioned problems associated with maintaining accurate and current telephone directories, companies have looked beyond conventional, printed publications like telephone books to offer manned services such as "411" Directory Assistance and to develop other services that utilize modern technologies such as the Internet and world wide web (WWW) to distribute telephone listing information.

411 Directory Assistance as it has been implemented in many telephone markets, allows a telephone service customer to dial "411" from his telephone handset to speak with a live operator who will manually perform a database search based on information provided by the customer. If a desired telephone number is found, either a live operator will speak the number or a voice response unit (VRU) will sound the number. And, in some cases, the 411 Directory Assistance service will provide outbound call initiation capabilities to couple the customer to his intended called party without requiring the customer to make an additional telephone call. Although 411 Directory Assistance services do allow users to receive listing information and to initiate an outbound call to an intended party, unfortunately, 411 Directory Assistance services are manned, labor-intensive services that can provide only limited information (i.e., a telephone number and a street address) related to a limited domain of telephone numbers. That is, if a customer does not generally know the geographic area in which an intended called party resides or is located, or if the intended called party is outside of a limited database of telephone numbers, no telephone number will be found and provided to the customer.

As noted above, some companies have looked to modern technologies such as the Internet and WWW to distribute more accurate, current, and comprehensive telephone listing information. Online directory services like the SWITCHBOARD™ service located at www.switchboard.com usually allow a network user to visit a WWW site, fill-in a directory query form, and have the online service automatically perform a database query. The online service will transmit all located listings to the user for display by his computer and web browser. Although, online listing services, like the SWITCHBOARD™ service allow an unlimited number of database queries and although online services often maintain very accurate, current, and comprehensive directories, unfortunately, there is no way to request that a call be initiated and completed to a particular intended called party based on the results of any particular online query. That is, a network user may be able to obtain telephone directory information online, but must then manually initiate corresponding call(s) to parties about whom information was located automatically. Such problems are exacerbated when a network user uses a single telephone line to access the Internet and the online directory service and to make and receive voice calls.

Thus, there exists a need to provide a system wherein a network user can receive accurate, current, and comprehensive telephone listing information and can request outbound telephone call initiation services via the Internet. Such a system must allow a network user to receive directory information and to request the initiation of a corresponding outbound call over a single telephone line.

SUMMARY OF THE INVENTION

In view of the foregoing comments related to the related art, it is the principal object of the present invention to solved the aforementioned problems.

It is another object of the present invention to provide a system wherein directory assistance information and corresponding outbound call initiation services may be requested and received via the Internet.

It is still another object of the present invention to provide an Internet-based directory assistance service that interacts with conventional telecommunications systems to cause outbound calls to be initiated.

It is still another object of the present invention to provide Internet-based directory assistance and telecommunications system call initiation services to users who may have only a single telephone line for both voice and data communications.

By achieving the aforementioned objects, the present invention provides certain benefits not heretofore realized. Generally, the present invention combines the capabilities of the Internet to distribute accurate, current, and comprehensive directory assistance information with the capabilities of telephony systems to provide automatic call initiation and completion services within a telecommunications system. For example, Internet service providers will benefit from the present invention by linking their systems to conventional telephony systems to provide enhanced call initiation and completion services. Additionally, conventional telecommunications providers will benefit from the present invention by providing call completion services to Internet service providers for which they may realize revenue streams. And, users, including those who have only a single telephone line, will benefit from the present invention by being able to access accurate, current, and comprehensive online telephone directories and by being able to automatically initiate corresponding, conventional telephone calls via the Internet.

The present invention achieves the aforementioned objects to realized the above-listed benefits by providing a system and method for retrieving directory assistance information and for requesting outbound call initiation services via the Internet. The system and method include and involve a data storage device and a processor that is coupled to the data storage device. The processor is operative to access an Internet site to request a directory assistance service based on a specified called party identifier, to receive a called party telephone number from the directory assistance service, to store the called party telephone number in the data storage device, and to access the Internet site to request the Internet site to initiate a call completion service to be performed within a telecommunications system based on the called party number.

According to another aspect of the present invention, a system and method for servicing a request for directory assistance information and for initiating a corresponding call within a telecommunications system are provided The system and method include and involve a data storage sub-system for storing the directory assistance information including a telephone number associated with a particular called party. Also included and involved is a processor that is coupled to the data storage sub-system and which is operative to receive the request for directory assistance information from a calling party via the Internet. The request includes an indicator of the called party. The processor is also operative to determine the telephone number based on the indicator related to the called party, and to receive a request from the calling party to initiate the call from the calling party to the called party within the telecommunications system based on the telephone number.

According to a final aspect of the present invention, an online directory assistance service system is provided that includes a directory assistance database facility that is accessible and searchable by a network user via the Internet, and a telephone call initiation service facility that is coupled to the directory assistance database facility and which is configured to transmit a call initiation instruction to a telephone call service facility that is configured to initiate outbound calls within a telecommunications system.

BRIEF DESCRIPTION OF THE DRAWINGS

The present invention is described in detail below with reference to the following drawing figures of which.

DETAILED DESCRIPTION OF THE PREFERRED EMBODIMENTS

Figure 1:
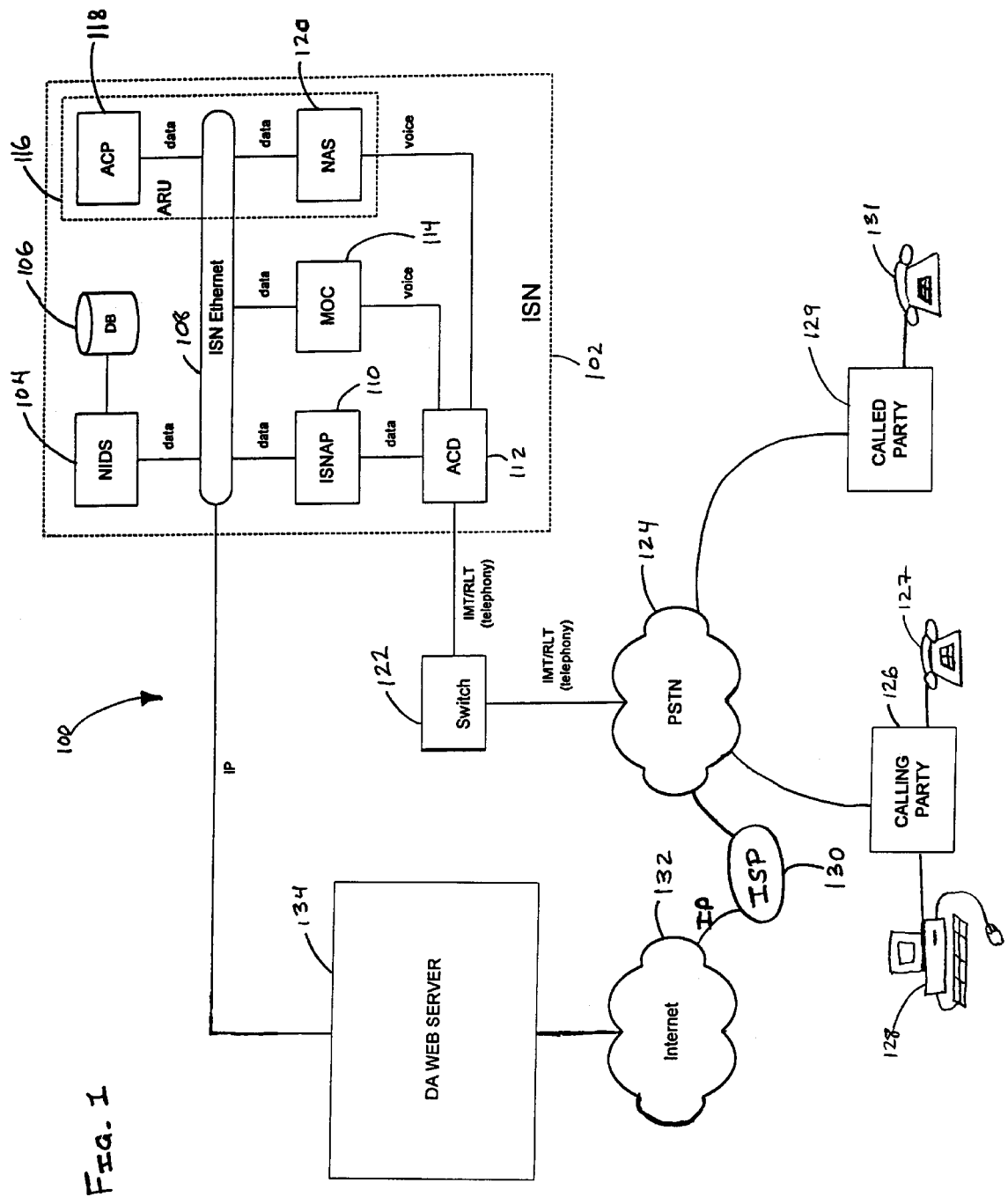
FIG. 1 is a diagram of a system in which automated directory assistance and call completion services are provided to users according to a preferred embodiment of the present invention.

The present invention is now described in detail with regard to the drawing figures that were briefly described above. A SYSTEM OVERVIEW section in which a general description of the present invention is provided is followed by a SYSTEM DESCRIPTION section and corresponding SYSTEM OPERATION section. Unless otherwise indicated, like parts and processes are referred to with like reference numerals.

System Overview

The present invention combines the directory assistance capabilities and structures of Internet-based online directory assistance information services and servers with telephone call initiation and completion structures and services often found within the publicly switched telephone network. As such, the present invention provides an Internet-based automated directory assistance service which allows calls to be initiated by an online directory assistance server computer system and, ultimately, which may be completed via the publicly switched telephone network. According to the present invention, a user may utilize his personal computer and world wide web browser software to visit an Internet-based directory assistance web site to retrieve directory assistance information. The user may access the Internet via an Internet Service Provider and via a telephony connection through the publicly switched telephone network over a conventional telephone line. Once the directory assistance web site is accessed, the user may enter directory assistance request information into an online form that will be transmitted via the user's personal computer to the directory assistance web site for processing.

Once received by the directory assistance web site, the web site will perform database look-up services to locate a telephone number and/or other information (address, etc.) in response to the user's request. Any information found by the directory assistance site may be transmitted via the Internet to the user for display on his computer system by his web browser software.

If the user desires, he may request the directory assistance web server to initiate a call to a particular called party at a corresponding telephone number found by the directory assistance web site. The user's call initiation/completion request will be communicated via the user's web browser software to the directory assistance web site.

Thereafter, the directory assistance web site will instruct the user (e.g., the calling party) to terminate his Internet connection (in the case that he has only a single telephone line for voice and data communications or in the case that the user intends to use only a single telephone line) to make his telephone line available for incoming calls. Next, the directory assistance web site will communicate with an intelligent services network or other telephony system of similar or like functionality and instruct the same to make two outbound calls that will form two call legs via the publicly switched telephone network: one to the called party and one to the to the calling party. Additionally, the directory assistance web site can be configured to instruct the intelligent services network or other telephony system to check the called party's telephone line to ensure that that the same is not busy; if not busy, the intelligent services network or other telephony system can then utilize signaling to keep the called party's telephone open and available to receive a call leg as previously described. Ultimately, if both call legs can be initiated successfully, they can be coupled by a switching facility to complete a call that was requested by the user via the Internet.

System Description

The system overview presented above generally described certain key features of the present invention. Those and additional features are now further illustrated with regard to the structures found within the present invention.

Referring now to FIG. 1, depicted therein is a system in which automated directory assistance and call completion services are provided to users. In particular, system 100 includes Intelligent Services Network (ISN) system 102, a directory assistance (DA) web server 134, the Internet 132, the publicly-switched telephone network 124, a telephony switch 122, an Internet service provider (ISP) facility 130, a calling party 126 having a single telephone line coupled to a telephone station 127 and a personal computer system 128, and a called party 129 having a telephone station 131. Each of these structures is further described below.

The interconnections among the structures of system 100 will be immediately understood by those skilled in the art. For example, the connection of DA WEB SERVER 134 to ISN system 102 via a network protocol link (e.g., via a TCP/IP link) will be readily understood by those skilled in and knowledgeable of IP-based networking and messaging topologies and techniques. Moreover, the connection of ISN system 102 to switch 122 via an IMT/RLT telephony link to facilitate outbound telephone calls to calling party 126 and called party 129 will be readily understood by those skilled in and knowledgeable of telephony signaling and call routing. Additionally, the coupling of personal computer 128 and telephone stations 127 and 131 to PSTN 124 for respective voice and data communications will be immediately understood by those skilled in the art. Accordingly, since many of the structures within system 100 will be readily understood by those skilled in the art, detailed discussions of the same are omitted for purposes of brevity.

In terms of ISN system 102, the same incorporates a network information distribution system (NIDS) server 104 which is an automatic data processing system (e.g., a server computer and data storage sub-system configuration) that is configured to provide call processing data (e.g., billing data, etc.) to other call processing components maintained within ISN system 102. NIDS system 104 is coupled to a data storage system 106 and to an ISN Ethernet local area network 108. Ethernet™ is a trademark of XEROX CORPORATION. An ISN Adjunct Processor (ISNAP) 110 is configured to perform call processing functions along with an Automated Call Distributor 112 (ACD) system to service and route calls through ISN system 102. ISN system 102 includes one or more manually operated service consoles (MOC) 114 and Network Audio Servers 120 (NAS). Additionally, ISN system 102 includes an Automated Call Processor (ACP) to control the operations of its NAS unit(s) 120. ACP 118 and NAS unit(s) 120 are commonly grouped and classified together as an Audio Response Unit (ARU) as indicated by the phantom lines forming the box identified as ARU 116. ACP 118 may be implemented on a computer system such as the IBM RS/6000 manufactured and marketed by INTERNATIONAL BUSINESS MACHINES CORPORATION, or the DEC alpha-based computer system manufactured and marketed by DIGITAL EQUIPMENT CORPORATION.

As noted above, NIDS server 104 supplies database services to the other component parts of ISN system 102. In particular, NIDS server 104 is configured to process call billing and call accounting data and transactions for advanced telephony services such as subscriber-based advanced telephony services.

Coupled to ISN system 102 via an IP link is DA WEB SERVER 134. DA WEB SERVER 134 is configured as a web server computing system that is equipped with server software to provide automated directory assistance according to the present invention. In particular, DA WEB SERVER 134 is coupled to the Internet 132 in a conventional way and is operative to acknowledge network access from users and to serve network documents and related information and, in particular, directory assistance information, via the Internet. Such network documents may include a form that is served to a user via the Internet and that requests directory assistance information (e.g., an intended party's name, address, or some other indicator) to be filled-in Once filled-in by the user and sent back to DA WEB SERVER 134 via his web browser (e.g., the NETSCAPE® COMMUNICATOR™ manufactured and marketed by NETSCAPE COMMUNICATIONS CORP.) and the Internet 132, DA WEB SERVER 134, in conjunction with an appropriate CGI script, may process the filled-in form to extract parameters and data that may be used to perform a database query against a database of directory assistance information to locate telephone numbers, etc. based on the user's specified form entries. Such a database may include telephone number directory information for a large geographic area. Additional discussion related to the functionality of DA WEB SERVER 134 is found below in regard to FIG. 4.

Also coupled to ISN system 102 is switch 122 and the PSTN 124. Accordingly, DA WEB SERVER 134 is able to instruct and cause ISN system 102 to initiate outbound calls (e.g., call legs) via switch 122 to telecommunications system users such as calling party 126 and called party 129 and telephone stations 127 and 131, respectively, to complete calls in conjunction with directory assistance services that are provided via the Internet 132.

In FIG. 1, ISP facility 130 is coupled to the PSTN 124 and to the Internet 132. IPS facility 130 is a typical Internet service provider (ISP) facility that includes one or more modem facilities that are coupled to and accessible from the PSTN 124. Accordingly, subscribers (e.g., calling party 126) will be able to use his personal computer 128 and modem (not shown) to dial a PSTN accessible telephone number to reach ISP facility 130 to access or ramp to the Internet 132 and, ultimately, to DA WEB SERVER 134.

Figure 2:
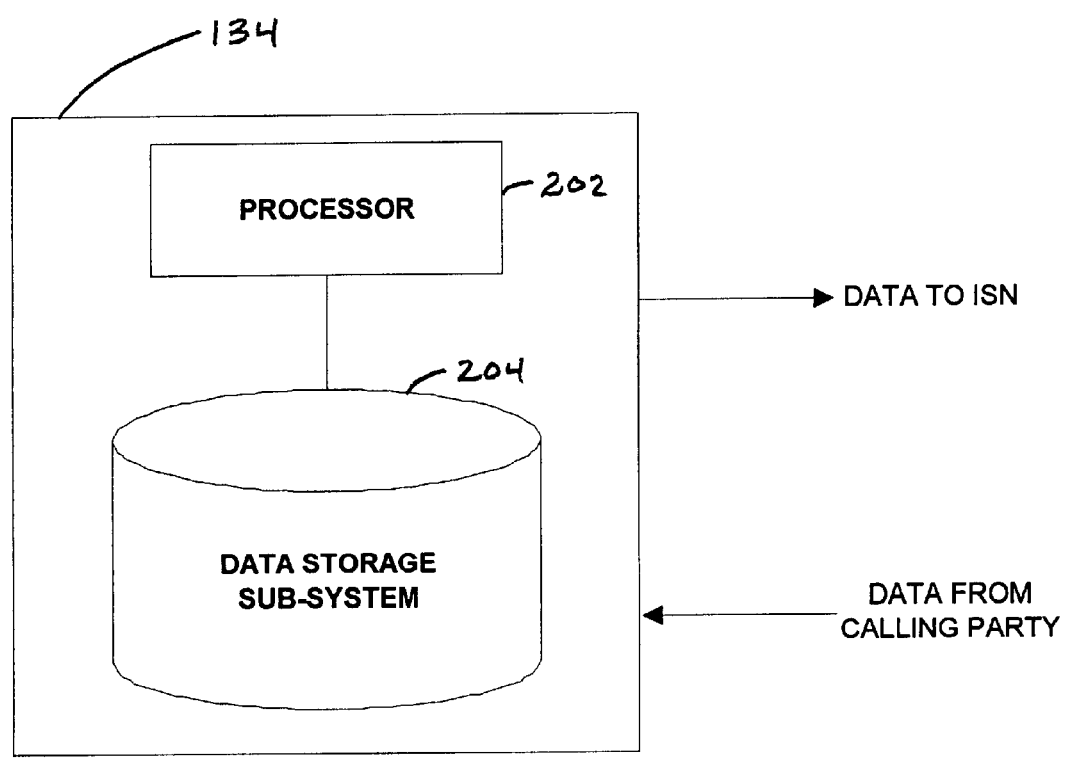
FIG. 2 is block diagram of an automatic data processing system that is configured as the directory assistance web server depicted in FIG. 1.

Referring now to FIG. 2, depicted therein is a block diagram of the structure of DA WEB SERVER 134. In particular, DA WEB SERVER 134 includes one or more processor(s) 202 and a data storage subsystem or memory device 204 which is coupled to processor 202. DA WEB SERVER is configured as a server computer or automatic data processing system like or similar to a SPARC 1000 computing system which is manufactured and marketed by SUN MICROSYSTEMS, INC. DA WEB SERVER is configured to execute and run appropriate WWW server and database management software that will enable the provisioning of directory assistance information in response to corresponding requests from users which are received via a network such as via the Internet and WWW. Preferably, DA WEB SERVER 134 is configured to execute and run appropriate WWW server and database management software to provide directory assistance functionality similar or like that found at the SWITCHBOARD™ WWW site (http://www.switchboard.com).

In addition to enabling directory assistance functionality as described above, DA WEB SERVER 134 is configured to communicate about call initiation and related data with ISN system 102 so that ISN system 102 can initiate outbound call legs to calling party 126 and called party 129. Such additional functionality is illustrated in the flowchart found in FIG. 4 which is discussed below. For purposes of clarity, however, it is important to note that instructing an ISN system like ISN system 102 to automatically initiate telephone calls via the PSTN 124 and switch 122 will be readily understood by those skilled in the art.

It should be understood that as DA WEB SERVER 134 is operative to perform database functionality to deliver directory assistance information to network users via the Internet and to instruct a telephone call service facility like ISN system 102 to initiate call legs to parties such as calling party 126 and called party 129, respectively, the structure of DA WEB SERVER 134 including processor 202 and data storage sub-system 204 and all related computer software form at least two logical facilities. Such facilities include a directory assistance database service facility which is accessible and searchable by network users via the Internet to access and retrieve directory assistance information, and a telephone call initiation service facility which can instruct a telephone call service facility like or similar to ISN system 102 to initiate telephone calls within a circuit-switched or other telecommunications system like or similar to the PSTN 124.

Figure 3:
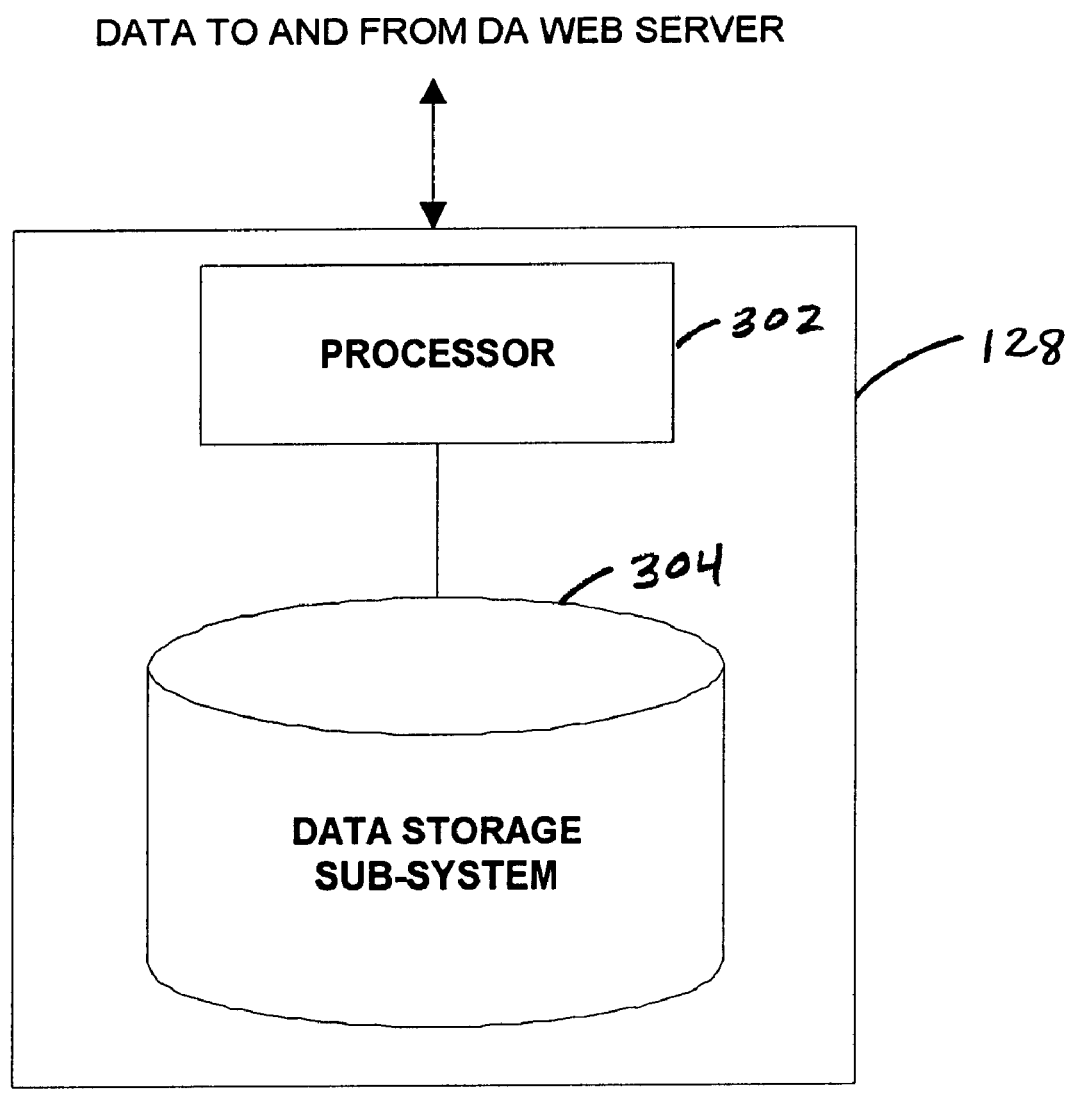
FIG. 3 is a block diagram of an automatic data processing system that is operated by the calling party depicted in FIG. 1.

Referring now to FIG. 3, depicted therein is block diagram of an automatic data processing system corresponding to personal computer 128 which is operated by calling party 126 and which is coupled via a single telephone line through PSTN 124 and ISP facility 130 to DA WEB SERVER 134. In particular, automatic data processing system 128 includes a processor 302 that is coupled to a data storage subsystem or memory device 304. Automatic data processing system 128 is a personal computing device like or similar in function to an IBM compatible computing system that is equipped with a PENTIUM® II microprocessor and related components and which is configured to execute and run a web browser client software package like or similar in function to the NETSCAPE® COMMUNICATOR™ browser suite which is manufactured and marketed by NETSCAPE COMMUNICATIONS CORP.

In addition to the structure shown in FIG. 3, automatic data processing system 128 is equipped with communications components such as a modem, a network interface card, or other network interface device that enables automatic data processing system 128 to communicate about directory assistance information and data with DA WEB SERVER 134 (FIG. 2) via the Internet 132 and WWW (e.g., via ISP facility 130).

It should be understood that although the present invention contemplates an implementation that is accessible via the public Internet and that is operable within the publicly switched telephone network, the present invention is not limited. To the contrary, the present invention certainly contemplates an implementation wherein a local network directory assistance server may exist within an intranet environment within, for example, a private organization. In such an implementation, outbound calls to called parties may be outbound calls within a organizational telephone system such as within a private branch exchange or other similar private telephone network. Accordingly, the present invention encompasses any packet-based network directory assistance system and switched/packet-based telephony system combination that may be implemented.

System Operation

Figure 4:
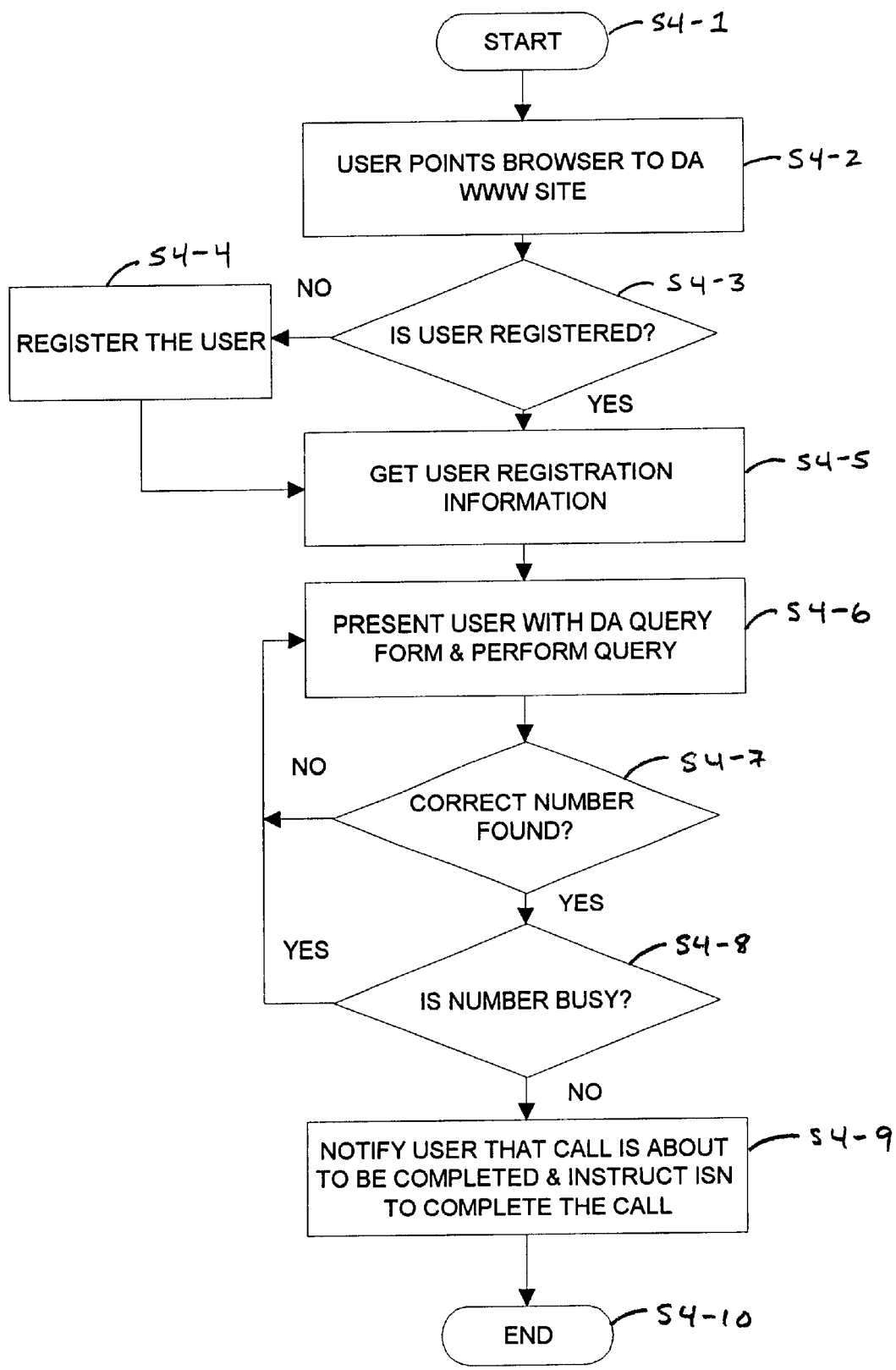
FIG. 4 is a flow-chart that illustrates the operations carried out within the system depicted in FIG. 1 to provide directory assistance and call completion services to users.

The structures depicted in FIGS. 1–3 are configured to operate together to provide directory assistance and telephone call completion services to users. The requisite and salient operations to bring about such functionality and services are illustrated in FIG. 4. More particularly, the operations depicted in FIG. 4 are, in many respects, intended to be carried out via computer software. Such computer software and, in particular, the programming constructs necessary to bring about such operations will be readily apparent to those skilled in the art after reviewing and understanding the operations illustrated in FIG. 4.

In regard to FIG. 4, processing starts at Step S4-1 and immediately proceeds to Step S4-2 where calling party 126, in conjunction with his personal computer 128, points his web browser to a DA ASSISTANCE WEB SITE (e.g., DA WEB SERVER 134—FIG. 1). Next, at Step S4-3, the DA WEB SERVER will operate to determine if calling party 126 is a registered user (e.g., via login information which may be queried, etc.).

If not, processing will proceed to Step S4-4 where calling party 126 will be queried as to whether he desires to become a registered user. Such processing will be readily apparent to those skilled in the art of WWW publishing and procedures, etc.

In any case, processing will proceed to Step S4-5 either from Step S4-4 or Step S4-3, where user registration information will be collected and a virtual session will be created between personal computer 128 and DA WEB SERVER 134. Such a virtual session may be established through use of Internet COOKIE technology which will be readily understood by those skilled in the art.

Next, at Step S4-6, DA WEB SERVER 134 will transmit and present a directory assistance query form to calling party 126 which may be displayed via his web browser on personal computer 128. Calling party. 126 may complete the form by including a person's name, a person's address, or any other identifier.

The calling party's web browser will then transmit the completed form (form data) to the DA WEB SERVER 134 which will then perform an appropriate database search routine or query against appropriate directory assistance databases (possibly located on one or more computer systems which may be geographically dispersed). Such processing will be readily understood by those skilled in the art.

Thereafter, processing proceeds to Step S4-7, where a determination will be made as to whether a correct telephone number was found (e.g., the user may indicate an acceptance toggle via his web browser, etc.). If not, processing may proceed one or more times to Step S4-6 for re-entry of identification information and the like and one or more corresponding new queries.

If the correct telephone number was found as determined at Step S4-7 and calling party 126 desires to make or have a call made to the correct number (e.g., to called party 129), processing proceeds to Step S4-8 where DA WEB SERVER 134 will instruct ISN system 102 (FIG. 1) via an appropriate call initiation message sent to ISN system 102 to initiate two outbound call legs: one to called party 129 and one to calling party 126. Of course, DA WEB SERVER 134 would have to be configured and programmed to retrieve a telephone number that corresponds to calling party 126; such a number may be retrieved by presenting an online form to calling party 126 for him to complete and specify a telephone number corresponding to telephone station 127. As noted above, telephone station 127 may be maintained on the same telephone line that calling party 126 uses to have his personal computer 128 access DA WEB SERVER 134 via the Internet.

Additionally, prior to instructing ISN system 102 to initiate such outbound call legs, DA WEB SERVER 134 may instruct ISN system 102 to make a determination as to whether the called party's telephone line is presently busy. Such a busy-signal detection may be performed through use of SS7 signaling without ringing the called party's telephone line and will be readily understood by those skilled in the art.

If the called party's telephone line is busy, processing may return to Step S4-6 to allow the user to enter additional requests for directory assistance and the like.

If the called party's telephone line was determined to not be busy, processing proceeds to Step S4-9.

At Step S4-9, DA WEB SERVER 134 will notify calling party 126 that his desired call is about to be completed and, in the case that calling party 126 intends to talk to called party 129 via the same telephone line that calling party 126 is using to access the Internet and DA WEB SERVER 134, to terminate his Internet-call connection and remain ready to receive an automatically generated incoming call (e.g., an outbound call leg) from ISN system 102 via switch 122 and the PSTN 124. DA WEB SERVER 134 may send a screen message that may be configured to read something like "Please disconnect your computer/modem from the internet and be ready to receive a telephone call linking you and your intended party."

Additionally, DA WEB SERVER 134 will instruct ISN system 102 to initiate the aforementioned call legs and to couple the same to complete the call when appropriate. The initiation of outbound call legs from ISN system 102 to parties coupled to the PSTN will be readily understood by those skilled in the art. Accordingly, if both call legs can be initiated successfully and then coupled appropriately via switch 122, calling party 126 may use his telephone station 127 to speak with called party 129 via his telephone station 131. The initiation of calls via ISN system 102 and, in particular, the operations of ACD 112 to initiate automatically generated outbound calls will be readily apparent to those skilled in the art.

It should be understood that the present invention will accommodate the case where the calling party uses a single telephone line to access both the Internet and to initiate and receive outbound and inbound telephone (voice). In such a case, the present invention is configured to notify calling party 126 to terminate his Internet connection and free his line in order to receive an inbound call that is initiated by ISN system 102 and that may be coupled to a second call leg initiated to called party 129. Alternatively, the present invention may be configured to allow calling party 126 to specify a telephone number that will receive an inbound call that, ultimately, will be coupled to a second call leg initiated to called party 129. In any case, two call legs will be initiated and coupled to complete a call according to the present invention: one to calling party 126 either on a single line used for voice and data communications or some other specified conventional telephone line, and one to called party 129.

Processing ends at Step S4-10.

In addition to the operations depicted in FIG. 4, additional operations may be included to bring about corresponding additional functionality. For example, billing processes may be implemented wherein the user (calling party) either may be a registered user of a unlimited subscription service or may be a user that pays as he goes for directory assistance and call completion services. A pay-as-you-go billing approach may be implemented with credit card processing systems which may incorporate online secure credit card transactions.

Additionally, although the operations depicted in FIG. 4 are directed to the case where a registered user most likely intends to use a single telephone line to access the Internet and to make and receive voice calls, the present invention is not so limited. In fact, additional operations could be included to query the user as to his intended destination telephone call termination location and corresponding telephone number. Such functionality would be desirable in the case of arranging for conference calls among multiple parties.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method for providing directory assistance information via a packet switched network including the Internet, comprising the steps of:

providing an Internet site with a directory assistance service that provides directory assistance information including telephone numbers;

receiving a user request for directory assistance;

processing the user request and selectively providing directory assistance information of a called party;

receiving a request to initiate a call completion service to be performed within a telecommunications system based on a telephone number of said called party;

instructing a calling party to terminate a connection to the packet switched network to make a line available for incoming calls if the calling party wishes to receive said call on said same line as said connection to the packet switched network;

communicating to the telecommunications system to make a first outbound call leg to the called party number and a second outbound leg to the calling party; and communicating to the telecommunications system that if both call legs are initiated successfully, to couple the two legs to complete a call between the called party and the calling party.

2. The method according to claim 1, wherein said receiving step and said processing steps are carried out by an automatic data processing system.

3. The method according to claim 2, wherein said automatic data processing system is a personal computer system.

4. The method according to claim 1, wherein said receiving step is carried out within a web browser client.

5. The method according to claim 1, wherein said telecommunications system is the publicly switched telephone network.

6. A method for servicing a request for directory assistance information received via a packet switched network including the Internet, comprising the steps of:

receiving said request from a calling party for directory assistance information via the packet switched network, said request including an indication of a called party;

determining a called party telephone number based on said indication of said called party;

receiving a request to initiate said call within said telecommunications system based on said called party telephone number;

instructing the calling party to terminate a connection to the packet switched network to make a line available for incoming calls if the calling party wishes to receive said call on said same line as said connection to the packet switched network; and communicating to said telecommunications system to make a first outbound call leg to the called party telephone number and a second outbound call leg to the calling party and that if both call legs are initiated successfully, to couple the two legs to complete a call between the called party and the calling party.

7. The method according to claim 6, wherein said determining step further includes the step of performing a database query based on said indication of said called party.

8. The method according to claim 6, wherein said determining step and said receiving steps are carried out within a network accessible server computing system.

9. The method according to claim 6, further comprising the step of:

transmitting said called party telephone number to a calling party via the Internet.

10. The method according to claim 6, wherein said indication of said called party is a name of said called party.

11. The method of claim 6, further comprising the step of instructing said telecommunications system to determine whether the called party's telephone line is available to receive calls.

12. A method for placing a call within a telecommunications system, comprising the steps of:

accessing an Internet site to request a directory assistance service based on a called party identifier;

receiving a called party telephone number from said directory assistance service;

accessing said Internet site to request said Internet site to commence a call initiation process to be performed within said telecommunications system based on said called party telephone number;

instructing a telephone service facility to initiate a first call leg within said telecommunications system to a called party based on said called party telephone number, said telephone service facility coupled to said telecommunications system;

instructing a calling party to terminate a connection to the Internet to make a line available for incoming calls if the calling party wishes to receive said call on said same line as said connection to a packet switched network including the Internet;

instructing said telephone service facility to initiate a second call leg within said telecommunications system to the calling party; and coupling said first call leg to said second call leg to complete said call.

13. The method according to claim 12, wherein said receiving step and said accessing steps are carried out by an automatic data processing system configured as a network client computing system.

14. The method according to claim 12, wherein said instructing steps are carried out by an automatic data processing system configured as a network server computing system.

15. The method according to claim 12, wherein said coupling step is carried out by a switching facility that is coupled to said telecommunications system.

16. The method according to claim 12, wherein said instructing steps cause said telephone service facility to automatically generate said first and said second call legs.

17. A system for servicing a request for directory a information, comprising:

a data storage sub-system storing said directory assistance information including a telephone number associated with a particular called party; and a processor coupled to said data storage sub-system and operative to receive said request for directory assistance information from a calling party via a packet switched network including the Internet, said request including an indicator of said called party to determine said telephone number based on said indicator of said called party, and to receive a request from said calling party to initiate said call from said calling party to said called party within a telecommunications system based on said telephone number, wherein said telephone service facility is coupled to a switching facility, said telephone service facility initiating said call from said calling party to said called party by initiating a first call leg to said called party via said switching facility and a second call leg to said calling party via said switching facility and by instructing said switching facility to couple said first and said second call legs to complete said call, the calling party being instructed to terminate a connection to the packet switched network to make a line available for incoming calls if the calling party wishes to receive said call on said same line as said connection to the packet switched network.

18. The system according to claim 17, wherein said data storage sub-system is a network addressable resource that is addressable and accessible via the Internet.

19. The system according to claim 17, wherein said processor, receives said request for directory assistance information from said calling party via a network connection.

20. The system according to claim 19, wherein said network connection is a dial-up connection via an Internet service facility over a telephone line corresponding to said calling party.

21. The system according to claim 20, wherein said call from said calling party to said called party to be completed within said telecommunications system in part via said telephone line.

22. The system according to claim 17, wherein said request from said calling party to initiate said call from said calling party to said called party within said telecommunications system is received via the Internet.

23. The system according to claim 17, wherein said processor is further coupled to a telephone service facility, processor further operative to instruct said telephone service facility to initiate said call from said calling party to said called party within said telecommunications system.

* * * * *